United States Patent
Kanada

(10) Patent No.: US 11,893,735 B2
(45) Date of Patent: Feb. 6, 2024

(54) SIMILARITY DETERMINATION APPARATUS, SIMILARITY DETERMINATION METHOD, AND SIMILARITY DETERMINATION PROGRAM

(71) Applicant: FUJIFILM Corporation, Tokyo (JP)

(72) Inventor: Shoji Kanada, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 362 days.

(21) Appl. No.: 17/170,822

(22) Filed: Feb. 8, 2021

(65) Prior Publication Data
US 2021/0182629 A1 Jun. 17, 2021

Related U.S. Application Data

(63) Continuation of application No. PCT/JP2019/023817, filed on Jun. 17, 2019.

(30) Foreign Application Priority Data

Aug. 31, 2018 (JP) .................. 2018-162858

(51) Int. Cl.
  *G06K 9/00* (2022.01)
  *G06T 7/00* (2017.01)
  (Continued)

(52) U.S. Cl.
  CPC ...... *G06T 7/0014* (2013.01); *G06F 18/24147* (2023.01); *G06N 3/045* (2023.01)

(58) Field of Classification Search
  CPC .............. G06T 7/0012–0016; G06T 2207/10064–10136;
  (Continued)

(56) References Cited

U.S. PATENT DOCUMENTS 8,958,613 B2 2/2015 Kondo et al.
10,930,396 B2 2/2021 Kanada
(Continued)

FOREIGN PATENT DOCUMENTS

CN 102208105 10/2011
CN 106164903 11/2016
(Continued)

OTHER PUBLICATIONS

Hiroaki Takebe et al., "Similar CT image retrieval method based on lesion nature and their three-dimensional distribution," with English Abstract, IEICE Technical Report, vol. 117, Jun. 2017, pp. 57-62.
(Continued)

*Primary Examiner* — Atiba O Fitzpatrick
(74) *Attorney, Agent, or Firm* — JCIPRNET

(57) ABSTRACT

A finding classification unit classifies each pixel of a first medical image into at least one finding. A feature amount calculation unit calculates a first feature amount for each finding. A weighting coefficient setting unit sets a weighting coefficient indicating a degree of weighting, which varies depending on a size of each finding, for each finding. A similarity derivation unit performs a weighting operation for the first feature amount for each finding calculated in the first medical image and a second feature amount for each finding calculated in advance in a second medical image on the basis of the weighting coefficient to derive a similarity between the first medical image and the second medical image.

16 Claims, 10 Drawing Sheets

(51) Int. Cl.
*G06F 18/2413* (2023.01)
*G06N 3/045* (2023.01)

(58) Field of Classification Search
CPC ....... G06T 2207/30004–30104; G06T 7/0014; G06T 7/0016; G06T 7/10; G06T 7/11; G06T 7/194; G06T 2207/30061; G06T 2207/20084; G06T 2207/20081; G06V 2201/03–034; G06V 10/761; G06V 10/751; G06V 10/757; G06V 10/759; G06V 10/443; G06V 10/74; G06V 10/75; G06V 2201/031; G06V 2201/032; G06V 2201/033; G06V 10/44; G06V 10/82; G06V 10/454; G06V 10/70; G06F 18/22; G06F 16/532; G06F 16/583; G06F 16/5838; G06F 16/5854; G06F 16/5862; G16H 30/00; G16H 30/20; G16H 30/40; G16H 70/00; G16H 70/20; G16H 70/60; Y10S 707/99933; Y10S 707/99931; Y10S 707/99936; G06N 3/08; G06N 20/00; G06N 3/045

See application file for complete search history.

(56) References Cited

U.S. PATENT DOCUMENTS

| | | | | |
|---|---|---|---|---|
| 2002/0065460 | A1* | 5/2002 | Murao | G16H 50/20 |
| | | | | 382/128 |
| 2008/0037876 | A1* | 2/2008 | Galperin | G16H 50/20 |
| | | | | 382/209 |
| 2011/0243403 | A1 | 10/2011 | Mizuno | |
| 2013/0114867 | A1* | 5/2013 | Kondo | G06V 30/1985 |
| | | | | 382/128 |
| 2013/0311502 | A1* | 11/2013 | Takata | G16H 50/70 |
| | | | | 707/758 |
| 2015/0098638 | A1* | 4/2015 | Syeda-Mahmood | G06F 18/00 |
| | | | | 382/131 |
| 2017/0011186 | A1* | 1/2017 | Oosawa | G06F 16/00 |
| 2017/0011187 | A1* | 1/2017 | Oosawa | G06T 1/00 |
| 2017/0091930 | A1 | 3/2017 | Kozuka et al. | |
| 2019/0197688 | A1* | 6/2019 | Moriwaki | G06T 7/11 |
| 2019/0371439 | A1* | 12/2019 | Lisowska | G16H 10/60 |
| 2020/0058390 | A1* | 2/2020 | Kohle | G06V 10/761 |
| 2023/0106440 | A1* | 4/2023 | Golden | G06V 10/82 |
| | | | | 382/131 |

FOREIGN PATENT DOCUMENTS

| | | |
|---|---|---|
| CN | 106560827 | 4/2017 |
| JP | 2000342558 | 12/2000 |
| JP | 2001117936 | 4/2001 |
| JP | 2002230518 | 8/2002 |
| JP | 2011118543 | 6/2011 |
| WO | 2013065090 | 5/2013 |
| WO | 2018116727 | 6/2018 |

OTHER PUBLICATIONS

"Office Action of Japan Counterpart Application" with English translation thereof, dated Nov. 9, 2021, p. 1-p. 7.
"International Search Report (Form PCT/ISA/210) of PCT/JP2019/023817," dated Sep. 3, 2019, with English translation thereof, pp. 1-3.
"Written Opinion of The International Searching Authority (Form PCT/ISA/237) of PCT/ JP2019/023817," dated Sep. 3, 2019, with English translation thereof, pp. 1-6.
Adrien Depeursinge et al., "Case-based lung image categorization and retrieval for interstitial lung diseases: clinical workflows," Int J CARS, Jun. 2011, pp. 97-110.
Joseph Jacob et al., "Evaluation of computer-based computer tomography stratification against outcome models in connective tissue disease-related interstitial lung disease: a patient outcome study," BMC Medicine, vol. 14, Nov. 2016, pp. 1-13.
Tae Iwasawa, "Quantitative evaluation of CT images of interstitial pneumonia by computer," Journal of Tombography Research Society, vol. 41, Aug. 2014, pp. 1-11.
"Office Action of China Counterpart Application", dated Sep. 22, 2023, with English translation thereof, pp. 1-19.

* cited by examiner

FIG. 4

| TYPE OF FINDING | EVALUATION VALUE |
|---|---|
| INFILTRATIVE SHADOW | 2.9 |
| GROUND-GLASS SHADOW | 7.6 |
| RETICULAR SHADOW | 8.5 (MAXIMUM) |
| BRONCHODILATATION | 3.2 |
| . . . | . . . |
| . . . | . . . |
| NORMAL LUNG | -7.1 |
| LOW ABSORPTION AREA (EMPHYSEMA) | -12.3 |

FIG. 6

| TYPE OF FINDING | VOLUME |
|---|---|
| GROUND-GLASS SHADOW | 20540 |
| INFILTRATIVE SHADOW | 11210 |
| LOW ABSORPTION AREA | 2890 |
| BRONCHODILATATION | 4030 |
| RETICULAR SHADOW | 9680 |
| CYST | 1430 |
| NORMAL LUNG | 157830 |

| CASE IMAGE | SIMILARITY |
|---|---|
| IMG0012.dcm | 0.87 |
| IMG0254.dcm | 0.77 |
| IMG0123.dcm | 0.54 |
| IMG0022.dcm | 0.52 |

SIMILARITY DETERMINATION APPARATUS, SIMILARITY DETERMINATION METHOD, AND SIMILARITY DETERMINATION PROGRAM

CROSS-REFERENCE TO RELATED APPLICATIONS

This application is a Continuation of PCT International Application No. PCT/JP2019/023817 filed on Jun. 17, 2019, which claims priority under 35 U.S.C. § 119(a) to Japanese Patent Application No. 2018-162858 filed on Aug. 31, 2018. Each of the above application(s) is hereby expressly incorporated by reference, in its entirety, into the present application.

BACKGROUND OF THE INVENTION

1. Field of the Invention

The present disclosure relates a similarity determination apparatus, a similarity determination method, and a non-transitory computer recording medium storing a similarity determination program that determine a similarity between two medical images.

2. Description of the Related Art

In recent years, with the progress of medical apparatuses, such as a computed tomography (CT) apparatus and a magnetic resonance imaging (MRI) apparatus, high-resolution three-dimensional images with higher quality have been used for image diagnosis.

In the medical field, a similar case search apparatus has been known which searches for past cases similar to an examination image, such as a CT image to be examined, on the basis of the examination image (for example, see Case-based lung image categorization and retrieval for interstitial lung diseases: clinical workflows, Adrien Depeursinge et al., Int J CARS (2012) 7:97-110, Published online: 1 Jun. 2011, JP2013-065090A, and JP2011-118543A). Case-based lung image categorization and retrieval For interstitial lung diseases: clinical workflow, Adrien Depeursinge et al., Int J CARS (2012) 7:97-110, Published online: 1 Jun. 2011 discloses a method which classifies a case image of the lung into a plurality of regions indicating a plurality of types of tissues or lesions (hereinafter, it is assumed that tissues or lesions are generically referred to as findings), registers the plurality of regions in a case database, similarly classifies an examination image of the lung into a plurality of regions indicating a plurality of types of findings, and searches for a case image similar to the examination image on the basis of the classification result of the findings for the examination image. In addition, JP2013-065090A and JP2011-118543A disclose a method which compares a feature amount of an image, such as a density histogram of the image, the average of density, or a variance of density, with a feature amount of an image registered in a database to search for an image similar to an examination image. Further, as a method for calculating the similarity between images, a method has been proposed which sets a plurality of partial regions in at least one of a plurality of images, determines the similarity between each of the set partial regions and each corresponding region in other images, and weights and adds the determined similarities between the partial regions using a weighting coefficient set for each partial region to calculate the overall region similarity (see JP2000-342558A).

However, interstitial pneumonia is known as a lung disease. A method has been proposed which analyzes a CT image of a patient with interstitial pneumonia, and classifies and quantifies lesions indicating specific findings, such as honeycomb lung, a reticular shadow, and a cyst included in the CT image (see Evaluation of computer-based computer tomography stratification against outcome models in connective tissue disease-related interstitial lung disease: a patient outcome study, Joseph Jacobi et al., BMC Medicine (2016) 14:190, DOI 10.1186/s12916-016-0739-7 and Quantitative Evaluation of CT Images of Interstitial Pneumonia by Computer, Iwasawa Tae, Japanese Journal of Tomography, vol. 41, No. 2, August 2014). The method which analyzes a CT image and classifies and quantifies lesions makes it possible to easily determine the degree of lung disease. In addition, different colors are assigned to the classified and quantified regions and the regions are displayed, which makes it possible to easily diagnose how much a specific symptom region is included in the image.

Further, it is necessary to detect a structure in a three-dimensional image in order to extract a structure, such as an organ of interest, from a three-dimensional image such as a CT image. Here, a deep learning method has been proposed in order to classify the pixels of interest in an image into a plurality of classes. Deep learning is a machine learning method using a multi-layer neural network constructed by hierarchically connecting a plurality of processing layers.

In deep learning, in each layer of the multi-layer neural network, arithmetic processing is performed for a plurality of different arithmetic result data items obtained by the previous layer for input data, that is, data of the extraction result of feature amounts. Then, in the subsequent processing layers, arithmetic processing is further performed for the obtained data of the feature amounts to improve the recognition rate of the feature amounts, and the input data can be classified into a plurality of classes.

It is considered that the deep learning method is applied to the above-mentioned three-dimensional image to classify each pixel of the three-dimensional image into a plurality of classes. For example, in a case in which a plurality of types of structures included in a three-dimensional image are classified, deep learning is performed for a neural network, using a three-dimensional image as an input, such that the pixel to be processed in the three-dimensional image is classified into any one of a plurality of types of structures. The use of the neural network subjected to deep learning makes it possible to classify a pixel to be processed of the input three-dimensional image into any one of the plurality of types of structures.

SUMMARY OF THE INVENTION

The methods disclosed in Case-based lung image categorization and retrieval For interstitial lung diseases: clinical workflow, Adrien Depeursinge et al., Int J CARS (2012) 7:97-110, Published online: 1 Jun. 2011, JP2013-065090A, JP2011-118543A, and JP2000-342558A are used to search for a case image including a lesion similar to that in the lung in the examination image. On the other hand, the importance of a characteristic finding included in the examination image varies depending on the size of the finding.

The present disclosure has been made in view of the above-mentioned problems and an object of the present disclosure is to appropriately determine a similarity between images on the basis of the size of findings included in the image.

According to the present disclosure, there is provided a similarity determination apparatus that determines a similarity between a first medical image and a second medical image. The similarity determination apparatus comprises: a finding classification unit that classifies each pixel of the first medical image into at least one of a plurality of types of findings; a feature amount calculation unit that calculates a first feature amount for each finding classified in the first medical image; a weighting coefficient setting unit that sets a weighting coefficient indicating a degree of weighting, which varies depending on a size of each finding, for each finding classified in the first medical image; and a similarity derivation unit that performs a weighting operation for the first feature amount for each finding calculated in the first medical image and a second feature amount for each finding calculated in advance in the second medical image on the basis of the weighting coefficient to derive the similarity between the first medical image and the second medical image.

Further, in the similarity determination apparatus according to the present disclosure, the weighting coefficient setting unit may set the weighting coefficient indicating the degree of weighting which varies depending on each finding.

Furthermore, in the similarity determination apparatus according to the present disclosure, the feature amount calculation unit may calculate the first feature amount including a first size feature amount indicating a size of each finding. The similarity derivation unit may derive a higher similarity as the first size feature amount and a second size feature amount calculated in advance in the second medical image become closer to each other and the size indicated by the first size feature amount and a size indicated by the second size feature amount calculated in advance in the second medical image become larger.

Moreover, in the similarity determination apparatus according to the present disclosure, the finding classification unit may calculate a plurality of evaluation values indicating a possibility of each pixel of the first medical image being each of the plurality of types of findings and classify each pixel of the first medical image into at least one of the plurality of types of findings on the basis of the plurality of evaluation values.

In addition, in the similarity determination apparatus according to the present disclosure, the finding classification unit may classify each pixel of the first medical image into a plurality of findings including a finding having a maximum evaluation value and a finding having an evaluation value that is equal to or greater than a predetermined threshold value.

In this case, the finding classification unit may use the threshold value determined on the basis of the evaluation value of the finding having the maximum evaluation value.

Further, in the similarity determination apparatus according to the present disclosure, the finding classification unit may classify each pixel into a group finding including two or more findings among the plurality of types of findings.

Furthermore, in the similarity determination apparatus according to the present disclosure, the finding classification unit may include a discriminator that has been subjected to machine learning so as to classify the plurality of types of findings and classify each pixel of the first medical image into the plurality of types of findings using the discriminator.

Moreover, the similarity determination apparatus according to the present disclosure may further comprise a search unit that searches for the second medical image similar to the first medical image as a similar medical image on the basis of similarities between the first medical image and a plurality of second medical images with reference to a case database in which the plurality of second medical images are registered and the second feature amounts for each of the plurality of second medical images are registered so as to be associated with each of the plurality of second medical images.

In this case, the similarity determination apparatus may further comprise a display control unit that displays a search result of the similar medical image on a display unit.

According to the present disclosure, there is provided a similarity determination method for determining a similarity between a first medical image and a second medical image. The similarity determination method comprises: classifying each pixel of the first medical image into at least one of a plurality of types of findings; calculating a first feature amount for each finding classified in the first medical image; setting a weighting coefficient indicating a degree of weighting, which varies depending on a size of each finding, for each finding classified in the first medical image; and performing a weighting operation for the first feature amount for each finding calculated in the first medical image and a second feature amount for each finding calculated in advance in the second medical image on the basis of the weighting coefficient to derive the similarity between the first medical image and the second medical image.

In addition, a non-transitory computer recording medium storing a program that causes a computer to perform the similarity determination method according to the present disclosure may be provided.

Another similarity determination apparatus according to the present disclosure comprises a memory that stores commands to cause a computer to perform a process of determining a similarity between a first medical image and a second medical image and a processor that is configured to execute the stored commands. The processor performs a process of: classifying each pixel of the first medical image into at least one of a plurality of types of findings; calculating a first feature amount for each finding classified in the first medical image; setting a weighting coefficient indicating a degree of weighting, which varies depending on a size of each finding, for each finding classified in the first medical image; and performing a weighting operation for the first feature amount for each finding calculated in the first medical image and a second feature amount for each finding calculated in advance in the second medical image on the basis of the weighting coefficient to derive the similarity between the first medical image and the second medical image.

According to the present disclosure, it is possible to appropriately determine the similarity between the first medical image and the second medical image on the basis of the size of findings included in the first and second medical images.

BRIEF DESCRIPTION OF THE DRAWINGS

FIG. 4 is a diagram illustrating an evaluation value corresponding to the type of finding for a central pixel of a certain region of interest.

FIG. 6 is a diagram illustrating calculation results of the volumes of findings.

FIG. 7 is a diagram illustrating a search result list.

DESCRIPTION OF THE PREFERRED EMBODIMENTS

Figure 1:
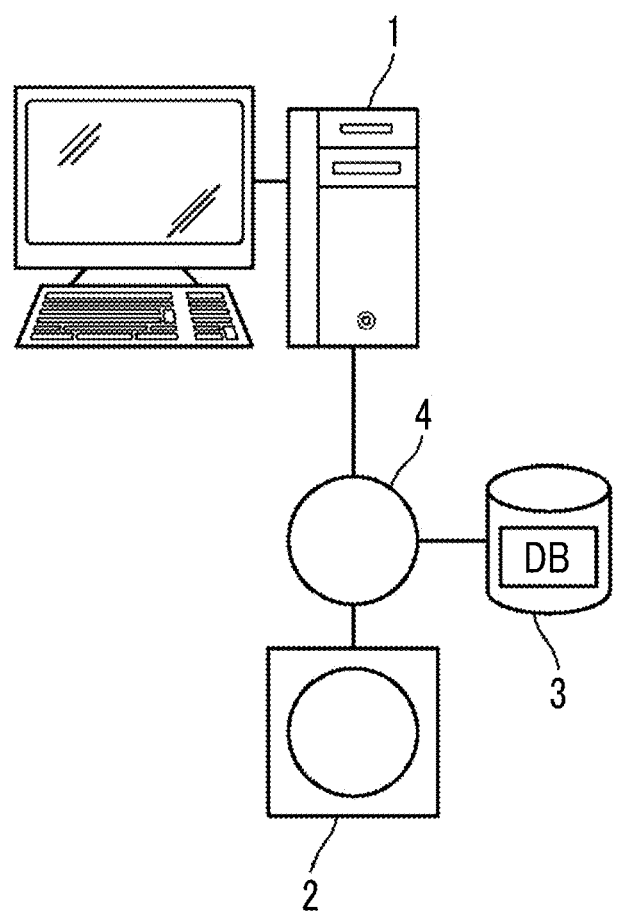
FIG. 1 is a hardware configuration diagram illustrating the outline of a diagnosis support system to which a similarity determination apparatus according to a first embodiment of the present disclosure is applied.

Hereinafter, embodiments of the present disclosure will be described with reference to the drawings. FIG. 1 is a hardware configuration diagram illustrating the outline of a diagnosis support system to which a similarity determination apparatus according to a first embodiment of the present disclosure is applied. As illustrated in FIG. 1, in the diagnosis support system, a similarity determination apparatus 1 according to this embodiment, a three-dimensional imaging apparatus 2, and an image storage server 3 are connected so as to communicate with each other through a network 4.

The three-dimensional imaging apparatus 2 is an apparatus that captures an image of a diagnosis target part of a subject to generate a three-dimensional image indicating the part and is, specifically, a CT apparatus, an MRI apparatus, a positron emission tomography (PET) apparatus, and the like. The three-dimensional image which consists of a plurality of slice images and has been generated by the three-dimensional imaging apparatus 2 is transmitted to the image storage server 3 and is then stored therein. In addition, in this embodiment, the diagnosis target part of a patient that is the subject is the lung, and the three-dimensional imaging apparatus 2 is a CT apparatus and generates a CT image of the chest including the lung of the subject as the three-dimensional image.

The image storage server 3 is a computer that stores and manages various types of data and comprises a high-capacity external storage device and database management software. The image storage server 3 performs communication with other apparatuses through the wired or wireless network 4 to transmit and receive, for example, image data. Specifically, the image storage server 3 acquires various types of data including the image data of the three-dimensional image generated by the three-dimensional imaging apparatus 2 through the network, stores the acquired data in a recording medium, such as a high-capacity external storage device, and manages the data. In addition, the storage format of the image data and the communication between the apparatuses through the network 4 are based on a protocol such as Digital Imaging and Communication in Medicine (DICOM). In this embodiment, it is assumed that the image storage server 3 stores three-dimensional images to be examined (hereinafter, referred to as examination images) and a case database DB having case images registered therein. The case database DB will be described below. In addition, in this embodiment, the examination image is a three-dimensional image consisting of one or more slice images (hereinafter, referred to as examination slice images). The case image is also a three-dimensional image consisting of one or more slice images (hereinafter, referred to as case slice images). Further, the examination image corresponds to a first medical image and the case image corresponds to a second medical image.

The similarity determination apparatus 1 is configured by installing a similarity determination program according to the present disclosure in one computer. The computer may be a workstation or a personal computer that is directly operated by a doctor who makes a diagnosis or may be a server computer that is connected to them through the network. The similarity determination program is recorded on a recording medium, such as a digital versatile disc (DVD) or a compact disc read only memory (CD-ROM), is distributed, and is installed in the computer from the recording medium. Alternatively, the similarity determination program is stored in a storage device of a server computer connected to the network, or is stored in a network storage so as to be accessed from the outside, is downloaded to the computer used by the doctor on request, and is then installed in the computer.

Figure 2:
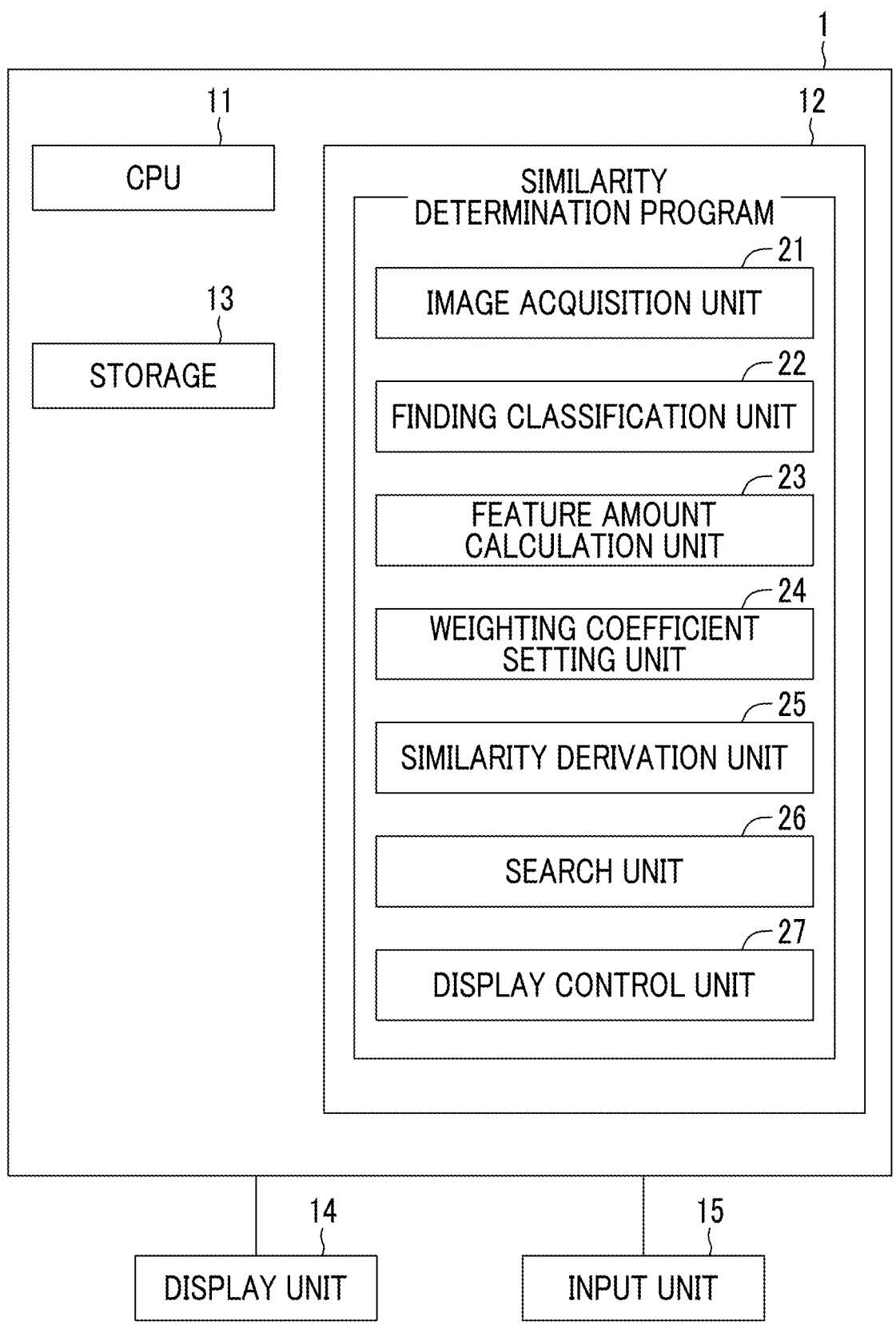
FIG. 2 is a block diagram schematically illustrating the configuration of the similarity determination apparatus according to the first embodiment.

FIG. 2 is a diagram schematically illustrating the configuration of the similarity determination apparatus according to the first embodiment of the present disclosure which is implemented by installing the similarity determination program in a computer. As illustrated in FIG. 2, the similarity determination apparatus 1 has the configuration of a standard workstation and comprises a central processing unit (CPU) 11, a memory 12, and a storage 13. In addition, a display unit 14 consisting of, for example, a liquid crystal display and an input unit 15 consisting of, for example, a keyboard and a mouse are connected to the similarity determination apparatus 1.

The storage 13 consists of, for example, a hard disk drive and a solid state drive (SSD). The storage 13 stores various kinds of information which include the examination image of the subject and information required for processes and are acquired from the image storage server 3 through the network 4.

Further, the memory 12 stores the similarity determination program. The similarity determination program defines the following processes as the processes performed by the CPU 11: an image acquisition process that acquires an examination image to be examined; a finding classification process that classifies each pixel of the examination image into at least one of a plurality of types of findings; a feature amount calculation process that calculates a first feature amount for each finding classified in the examination image; a weighting coefficient setting process that sets a weighting coefficient indicating the degree of weighting, which varies depending on the size of the finding, for each finding classified in the examination image; a similarity derivation process that performs a weighting operation for the first feature amount for each finding calculated in the examination image and a second feature amount for each finding calculated in advance in a case image according to the weighting coefficient to derive the similarity between the examination image and the case image; a search process that searches for a case image similar to the examination image on the basis of the derived similarity; and a display control process that displays search results on the display unit 14.

Then, the CPU 11 performs these processes according to the program such that the computer functions as an image acquisition unit 21, a finding classification unit 22, a feature amount calculation unit 23, a weighting coefficient setting unit 24, a similarity derivation unit 25, a search unit 26, and a display control unit 27.

The image acquisition unit 21 acquires an examination image V0 of the subject to be examined. Further, in a case in which the examination image V0 has been stored in the storage 13, the image acquisition unit 21 may acquire the examination image V0 from the storage 13.

The finding classification unit 22 classifies each pixel of a lung region included in the examination image V0 into at least one of a plurality of types of findings. Specifically, the finding classification unit 22 calculates a plurality of evaluation values indicating the possibility that each pixel of the lung region included in the examination image V0 will be each of a plurality of types of tissues or lesions (for example, findings) and classifies each pixel of the examination image V0 into at least one of the plurality of types of findings on the basis of the plurality of evaluation values. In this embodiment, it is assumed that the finding classification unit 22 classifies each pixel of the examination image V0 into one finding.

The finding classification unit 22 according to this embodiment includes a discriminator which consists of a multi-layer neural network generated by deep learning that is one kind of machine learning and specifies the type of finding, to which each pixel of the examination image V0 belongs, using the discriminator. In addition, the machine learning method is not limited to deep learning, and other methods including a support vector machine may be used.

In each layer of the multi-layer neural network, arithmetic processing is performed for data of a plurality of different feature amounts obtained by the previous layer, using various kernels. Then, in the subsequent layers, arithmetic processing can be further performed for the data of the feature amounts obtained by the arithmetic processing to improve the recognition rate of the feature amounts, and the input data can be classified into a plurality of classes.

Further, in this embodiment, the multi-layer neural network receives the examination image V0 as an input and outputs the classification result of the lung region into a plurality of types of findings. However, the multi-layer neural network may be configured such that it receives each of a plurality of examination slice images forming the examination image V0 as an input and outputs the classification result of the lung region into a plurality of types of findings.

Figure 3:
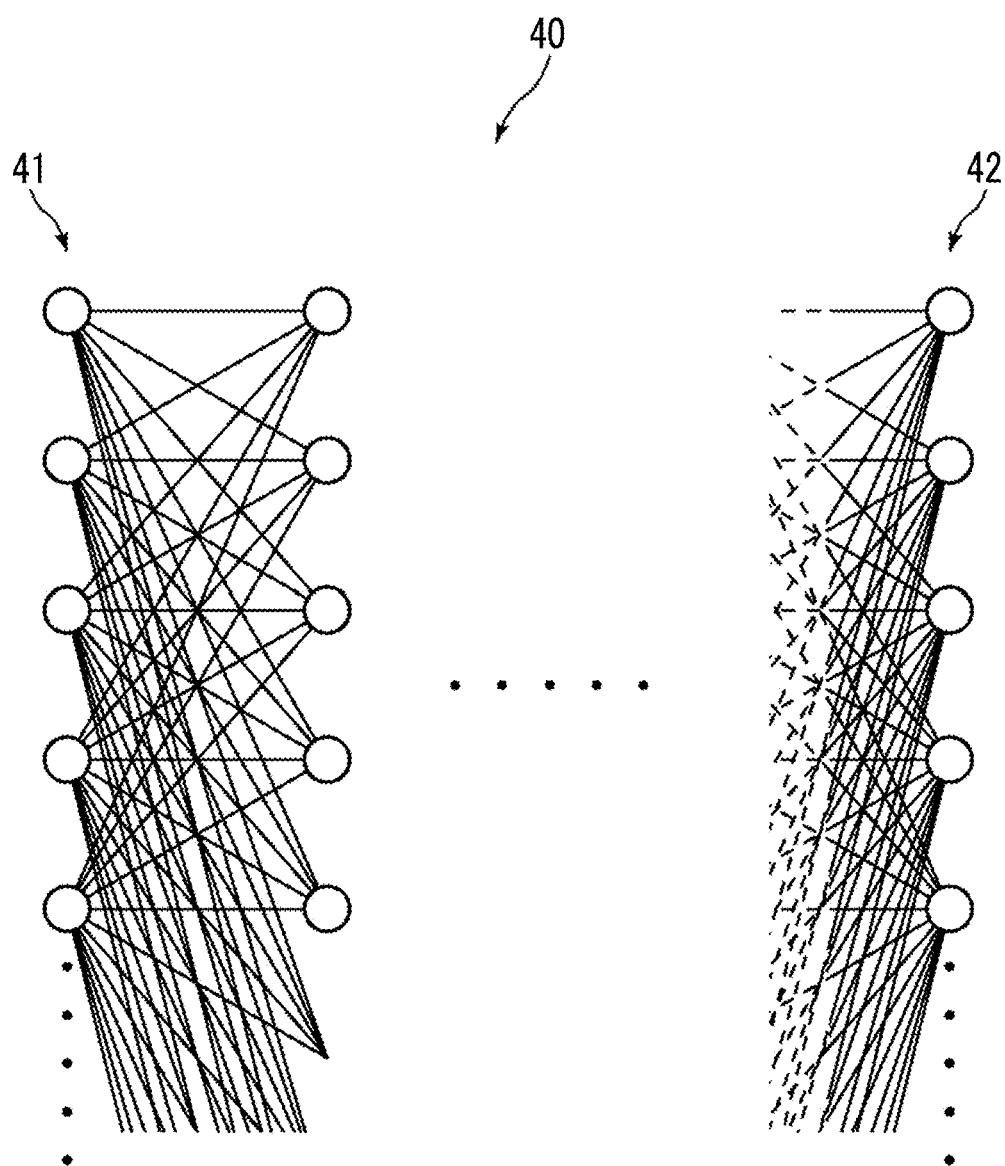
FIG. 3 is a diagram illustrating an example of a multi-layer neural network.

FIG. 3 is a diagram illustrating an example of the multi-layer neural network. As illustrated in FIG. 3, a multi-layer neural network 40 consists of a plurality of layers including an input layer 41 and an output layer 42. In this embodiment, learning is performed such that the lung region included in the examination image V0 is classified into a plurality of findings, such as an infiltrative shadow, a mass shadow, a ground-glass shadow, a centrilobular nodular shadow, a non-centrilobular nodular shadow, a reticular shadow, a linear shadow, interlobular septal thickening, a honeycomb lung, a cyst, a low absorption area (emphysema), emphysema tendency, a cavity, pleural thickening, pleural effusion, bronchodilatation, traction bronchiectasis, artery, a normal lung, a chest wall, and mediastinum. In addition, the types of findings are not limited thereto and may be more or less than these findings.

In this embodiment, the multi-layer neural network 40 learns these findings using a large amount of training data such as millions of training data items. In the learning, a region of interest with a predetermined size (for example, 1.5 cm×1.5 cm) is cut out from a cross-sectional image in which the types of findings have been known. Then, the region of interest is used as the training data. Then, the training data is input to the multi-layer neural network 40 and the result of a finding type classification process (hereinafter, referred to as a classification result) is output from the multi-layer neural network 40. Then, the output result is compared with the training data, and the weight of the connection between the layers of units (represented by circles in FIG. 3) included in each layer of the multi-layer neural network 40 is corrected from the output side to the input side according to whether the answer is correct or incorrect. The correction of the weight of the connection is repeated using a large amount of training data a predetermined number of times or until the accuracy rate of the output classification result reaches 100%, and the learning ends.

Further, in a case in which the input image is the examination slice image, in the learning of the multi-layer neural network 40, a two-dimensional region normalized to a predetermined size (for example, 1.5 cm×1.5 cm) is cut out from a slice image forming a three-dimensional image in which a lesion has been known, and the image of the cut-out two-dimensional region is used as the training data.

The finding classification unit 22 extracts a lung region that is a target region from the examination image V0 for classification. Any method, such as a method that creates a histogram of the signal value of each pixel of the examination image V0 and performs threshold processing for the lung to extract the lung region or a region growing method based on a seed point indicating the lung, can be used as a method of extracting the lung region. In addition, a discriminator which has been subjected to machine learning so as to extract the lung region may be used.

In a case in which the finding classification process is performed, the finding classification unit 22 sequentially cuts out the region of interest having the same size as the training data from the lung region of the examination image V0 and inputs the region of interest to the discriminator consisting of the multi-layer neural network 40. Then, for a central pixel of the cut-out region of interest, an evaluation value corresponding to each classification of the findings is output. In addition, the evaluation value corresponding to each classification is an evaluation value indicating the possibility that the central pixel will belong to each classification. As the evaluation value becomes larger, the possibility that the central pixel will belong to the classification becomes higher.

FIG. 4 is a diagram illustrating an evaluation value corresponding to the type of finding for a central pixel of a certain region of interest. In addition, FIG. 4 illustrates evaluation values for some findings for simplicity of description. In this embodiment, the discriminator classifies the central pixel of the region of interest into a finding with the maximum evaluation value among a plurality of findings. For example, in a case in which the evaluation values illustrated in FIG. 4 are acquired, the central pixel of the region of interest has the highest possibility of being the reticular shadow and has the second highest possibility of being the ground-glass shadow. On the contrary, there is almost no possibility that the central pixel will be the normal lung or the low absorption area. Therefore, in a case in which the evaluation values as illustrated in FIG. 4 are acquired, the central pixel of the region of interest is classified into the reticular shadow having a maximum evaluation value of 8.5 by the finding classification process. In this way, all of the pixels of the lung region included in the examination image V0 are classified into any of a plurality of types of findings.

The finding classification unit 22 sequentially cuts out the same voxel region as the training data from the extracted lung region and sequentially inputs the cut-out voxel region to the discriminator of the multi-layer neural network 40 which has been trained as described above. Then, for the central pixel of the cut-out region, a plurality of evaluation values for each of a plurality of types of lesion regions are output. The finding classification unit 22 classifies the central pixel of the region input to the multi-layer neural network 40 into a finding with the maximum evaluation value among the plurality of evaluation values and generates the classification result of findings. In this way, all of the pixels of the lung region included in the examination image V0 are classified into any of a plurality of types of findings.

Figure 5:
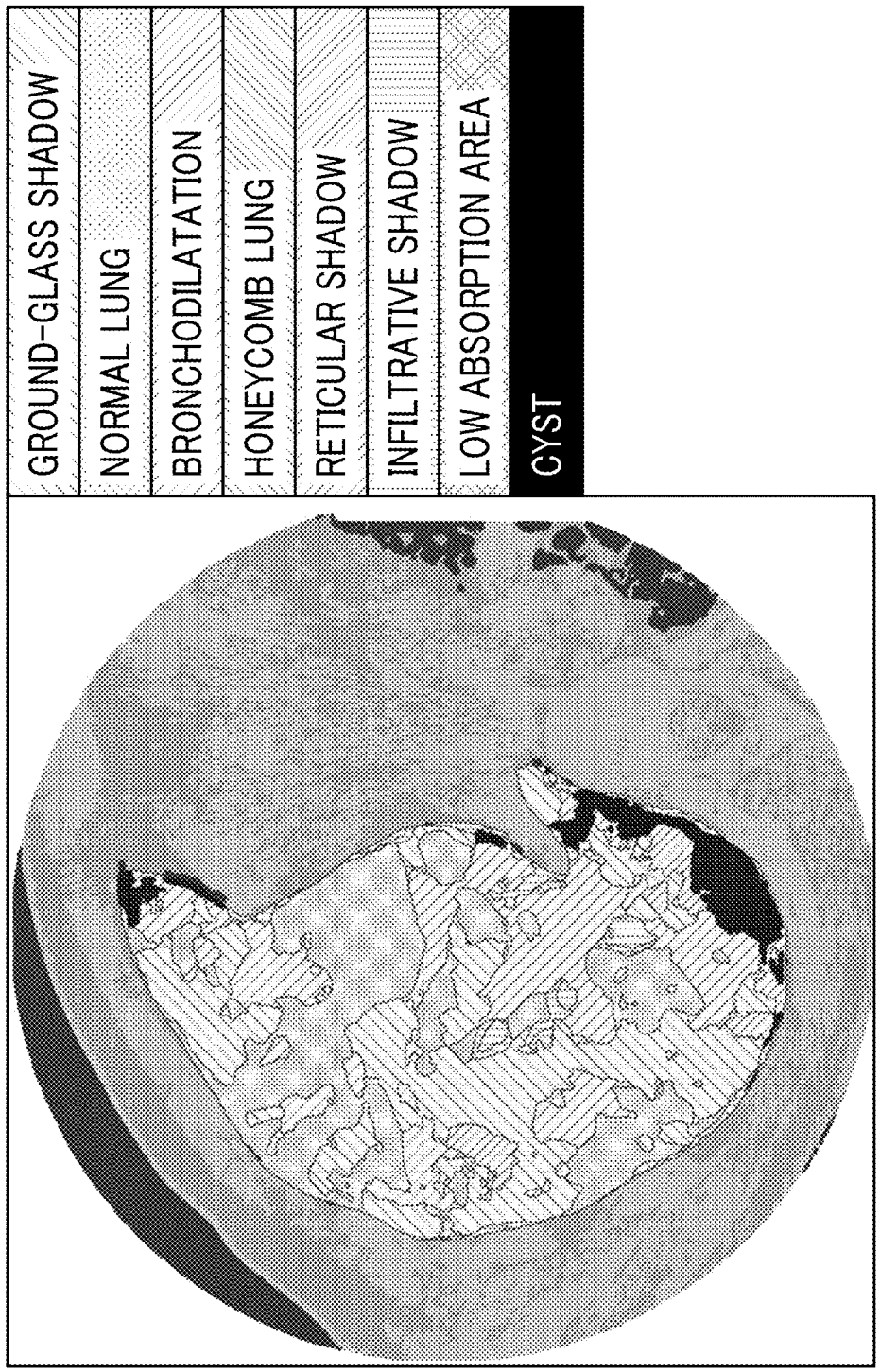
FIG. 5 is a diagram illustrating a cross section of a mapping image to which colors corresponding to classifications are assigned.

The finding classification unit 22 assigns a color to each classified region of the examination image V0 on the basis of the result of the finding classification process to generate a mapping image. Specifically, the finding classification unit 22 assigns the same color to the pixels classified into the same finding for all of the pixels in a three-dimensional space classified into any of the plurality of types of findings to generate a three-dimensional mapping image. FIG. 5 is a diagram illustrating a cross section of the mapping image in which colors corresponding to a plurality of types of classifications are assigned. In addition, FIG. 5 illustrates the mapping image in a case in which the pixels are classified into eight types of findings, that is, a ground-glass shadow, a normal lung, bronchodilatation, a honeycomb lung, a reticular shadow, an infiltrative shadow, a low absorption area, and a cyst for simplicity of description. In addition, the display control unit 27 which will be described below may display the mapping image on the display unit 14. In a case in which the mapping image is displayed on the display unit 14, as illustrated in FIG. 5, a cross-sectional image of any cross section in the three-dimensional mapping image may be displayed. However, the present disclosure is not limited thereto, and the three-dimensional mapping image may be displayed on the display unit 14.

The feature amount calculation unit 23 calculates a feature amount for each of the classified findings in the examination image V0. Specifically, the feature amount calculation unit 23 calculates, as the feature amount, at least one of the size of a region for each finding, average density for each finding, the variance of density for each finding, the number of regions for each finding, or the average size of the region for each finding. In addition, it is assumed that the feature amount calculated for the examination image V0 is referred to as a first feature amount. Further, for example, the size of the region for each finding, the number of regions for each finding, and the average size of the region for each finding are size feature amounts. The volume of the region for each finding can be used as the size of the region for each finding.

In addition, a file name, evaluation values for a plurality of findings in each pixel, and feature amounts for each finding are registered for each of a plurality of case images in the above-described case database DB. It is assumed that the feature amount registered in the case database DB for the case image is referred to as a second feature amount. The first feature amount and the second feature amount are normalized to values that are equal to or greater than 0 and equal to or less than 1. In a case in which evaluation values for a plurality of findings in each pixel and feature amounts for each finding are acquired for the examination image V0, the examination image V0 is registered as a new case image in the case database DB. In this case, the evaluation value and the first feature amount for the examination image V0 are registered as the evaluation value and the second feature amount for the new case image in the case database DB.

The weighting coefficient setting unit 24 sets a weighting coefficient indicating the degree of weighting, which varies depending on the size of each finding, for each finding into which each pixel of the examination image V0 has been classified. The weighting coefficient is used for a weighting operation that is performed for the first feature amount for each finding calculated in the examination image V0 and the second feature amount for each finding which has been calculated in the case image in advance, that is, has been registered in the case database DB in the similarity derivation process which will be described below.

Here, medical images have various features. Therefore, in a case in which the feature amounts are not appropriately weighted considering the importance of the feature amounts from the viewpoint of the medical images, the magnitude of the difference between the feature amounts does not correspond to the magnitude of the difference between the medical images, and the similarity deviates from the medical sense. Therefore, in a case in which the feature amounts are not appropriately weighted, in the search of a case image similar to the examination image V0, the search results are likely to be arranged in the order of inappropriate similarities.

Here, in a case in which the same findings having almost the same size are present in the examination image V0 and the case image, two images are medically similar to each other. Further, as a finding region becomes larger, the finding becomes more important in diagnosis. Therefore, the size of the finding is extremely important in determining the similarity between the images.

The findings include important findings, such as punctate shadows, that indicate the features of the initial state of a disease even in a case in which they have a small size. Further, in a case in which lung emphysema progresses due to aging, a slightly low absorption state occurs in the lung. The finding of low absorption is less important because it is more common in older patients. The low absorption findings in elderly persons are not so important even though they have a large size.

Therefore, in a case in which the finding of the punctate shadow and the low absorption finding in the elderly person are equally determined, a subtle difference in the low absorption area of a large region is larger than a difference in the punctate shadow. As a result, the similarity between the punctate shadows is buried in the similarity between the low absorption areas, and it is difficult to search for a case image including a case of the punctate shadow that is medically important.

For this reason, in this embodiment, the weighting coefficient setting unit 24 sets the weighting coefficient indicating the degree of weighting, which varies depending on the size of each finding, for each of a plurality of findings. The first size feature amount included in the first feature amount calculated by the feature amount calculation unit 23 can be used as the size of the finding. Specifically, the volume of the finding can be used. Here, the volume of the finding can be calculated by multiplying the number of pixels of each finding included in the three-dimensional examination image V0 by the volume per voxel in the examination image V0. FIG. 6 illustrates the calculation results of the volume of the findings. In FIG. 6, the unit of volume is cubic millimeters. The size of the lung varies depending on the patient. Therefore, it is preferable to use, as the size of the finding, finding occupancy (=the volume of the finding/the volume of the lung) obtained by normalizing the volume of the finding with the volume of the organ, that is, the volume of the lung. In this embodiment, it is assumed that finding occupancy is used as the size of the finding. In addition, the finding occupancy may be included as the first size feature amount in the first feature amount. In this case, the feature amount calculation unit 23 may calculate the finding occupancy.

For each finding of the examination image V0, the weighting coefficient setting unit 24 sets a weighting coefficient Wi for each finding, using the following Expression (1). In Expression (1), i is the type of finding and fi is a function that has the finding occupancy Pvi of each finding in the examination image V0.

$$Wi = fi(Pvi) \quad (1)$$

Here, as illustrated in FIG. 6, the number of digits of the value of the volume is different between a finding with a large size and a finding with a small size. Therefore, it is preferable to reduce the dimensions, for example, by converting the finding occupancy, which is three-dimensional information, into two-dimensional finding occupancy using the function fi. In this case, the difference in the size of the finding is matched with the sense of the doctor. For this reason, as described above, it is preferable to nonlinearly convert a finding which has a small size, but is important using the function fi in order to increase the importance of the finding. Therefore, in this embodiment, the function fi is set as represented by the following Expression (2).

$$fi = a \cdot (b \cdot X + (1-b) \cdot X^c) \quad (2)$$

Further, in Expression (2), a is a constant that determines a difference in the overall importance of each finding. c is a constant that has a value of 1 or less and determines the effect of emphasizing a finding with a small size. b is a constant that determines the degree of the effect by the constant c. In addition, $X = (Pvi)^{2/3}$ is established. The finding occupancy Pvi is multiplied by 2/3 to be converted from a three-dimensional value to a two-dimensional value.

The weighting coefficient setting unit 24 sets the function represented by Expression (2) for each finding and applies the function to Expression (1) to set the weighting coefficient Wi for each of the plurality of types of findings.

The similarity derivation unit 25 performs a weighting operation for the first feature amount for each finding calculated in the examination image V0 and the second feature amount for each finding calculated in advance in the case image on the basis of the weighting coefficient Wi set by the weighting coefficient setting unit 24 to derive the similarity between the examination image V0 and the case image. In addition, the similarity derivation unit 25 derives the similarities between the examination image V0 and all of the case images registered in the case database DB.

For the derivation, the similarity derivation unit 25 normalizes the first feature amount calculated for the examination image V0 to a value that is equal to or greater than 0 and equal to or less than 1. Then, the similarity derivation unit 25 calculates, as a feature amount difference Ddi, a difference in the distance between the first feature amount and the second feature amount of the case image for each finding, as represented by the following Expression (3). Further, in Expression (3), k indicates the type of feature amount, Tvk indicates the first feature amount for each type in the examination image V0, and Tck indicates the second feature amount for each type in the case image. Furthermore, the first feature amount and the second feature amount whose difference is calculated are the same type. In addition, in Expression (3), Σ indicates the calculation of the sum of $(Tvk-Tck)^2$ for all of the types of feature amounts. Further, since the first feature amount and the second feature amount are normalized to a value that is equal to or greater than 0 and equal to or less than 1, the feature amount difference Ddi is also a value that is equal to or greater than 0 and equal to or less than 1. Furthermore, in a case in which the first feature amount Tvk is equal to the second feature amount Tck, the feature amount difference Ddi is 0. Moreover, instead of the difference in the distance between the first feature amount and the second feature amount, for example, the absolute value of the difference between the first feature amount and the second feature amount may be used.

$$Ddi = \sqrt{(\Sigma(Tvk-Tck)^2)} \quad (3)$$

Then, the similarity derivation unit 25 calculates a similarity S0 between the examination image V0 and the case image, using the weighting coefficient Wi, as represented by the following Expression (4). That is, the similarity derivation unit 25 multiplies the feature amount difference Ddi by the weighting coefficient Wi for each finding and adds the multiplication results for all of the findings to calculate the similarity S0. In addition, in a case in which the similarity S0 is calculated using Expression (4), the similarity between the examination image V0 and the case image becomes higher as the distance between the first feature amount and the second feature amount becomes shorter. Therefore, a negative sign is given to Expression (4) such that, as the similarity between the examination image V0 and the case image becomes higher, the value of the similarity S0 becomes larger.

$$S0 = -\Sigma(Wi \times Ddi) \quad (4)$$

In contrast, in the calculation of the similarity by Expression (4), in a case in which the same findings have the same size, the similarity is 0. However, in a case in which the same lesions are compared with each other, the fact is that, as the size of the lesions becomes larger, the similarity between the lesions becomes higher. In a case in which the similarity is calculated by Expression (4), there is no difference between a case in which findings having a relatively large size have the same feature amount and a case in which findings having a relatively small size have the same feature amount and it is difficult to reflect the fact that, as the size of the lesions becomes larger, the similarity between the lesions becomes higher.

For this reason, for the same finding included in the examination image V0 and the case image, only the difference in size therebetween is not treated, and it is preferable that the similarity becomes higher as the sizes are more similar to each other. Therefore, in this embodiment, the similarity derivation unit 25 further calculates a difference Dsi between the sizes of the findings in the examination image V0 and the case image, using the following Expression (5). Further, in Expression (5), Pvi indicates the finding occupancy of a finding i in the examination image V0, and Pci indicates the finding occupancy of the finding i in the case image.

$$Dsi = 1 - |Pvi - Pci|/(Pvi + Pci) \quad (5)$$

Therefore, it is preferable that the similarity derivation unit 25 calculates a similarity S1 between the examination image V0 and the case image using the following Expression (6). Here, Ddi is a value that becomes smaller as the similarity between the feature amounts of the findings in the examination image V0 and the case image becomes higher and Dsi is a value that becomes larger as the sizes of the findings in the examination image V0 and the case image become more similar to each other. Therefore, it is possible to calculate the similarity that becomes higher as the examination image V0 and the case image become more similar to each other using Expression (6), considering the sizes of the same findings.

$$S1 = \Sigma(Wi \times (Dsi - Ddi)) \quad (6)$$

In a case in which the similarity S1 is calculated by Expression (6), the maximum value of the similarity S1 varies depending on the examination image V0. Therefore, it is preferable to normalize the similarity S1 under the condition that the similarity S1 between the examination image V0 and the case image is the maximum value, that is, the condition that there is no difference between the examination image V0 and the case image. Expression (7) is obtained by normalizing the similarity S1 calculated by Expression (6) under the condition that the similarity S1 between the examination image V0 and the case image is the maximum. In Expression (7), S2 indicates the normalized similarity.

$$S2 = S1/\Sigma Wi = \Sigma(Wi \times (Dsi - Ddi))/\Sigma Wi \quad (7)$$

In addition, in a case in which the similarity is calculated by Expression (4), it is preferable to normalize the similarity S0. Expression (8) is obtained by normalizing Expression (4) under the condition that the similarity S0 between the examination image V0 and the case image is the maximum value. In Expression (8), S3 indicates the normalized similarity.

$$S3 = S0/\Sigma Wi = \Sigma(Wi \times Dsi)/\Sigma Wi \quad (8)$$

The search unit 26 performs a search process of searching for a case image similar to the examination image V0 as a similar case image from the case database DB on the basis of the similarity S2. First, the case database DB will be described.

A plurality of case images, each of which consists of one or more case slice images, are registered in the case database DB. Specifically, as a classification result of findings for each of the plurality of case images, the feature amount (that is, the second feature amount) is registered so as to be associated with each of the plurality of case images. In this embodiment, in a case in which a new examination image V0 is acquired, the examination image V0 is registered as a new case image in the case database DB.

The search unit 26 searches for a case image similar to the examination image V0 as the similar case image on the basis of the similarities S2 between the examination image V0 and all of the case images registered in the case database DB. Specifically, the search unit 26 sorts the case images in descending order of the similarity S2 to create a search result list. FIG. 7 is a diagram illustrating the search result list. As illustrated in FIG. 7, the case images registered in the case database DB are sorted in descending order of the similarity S2 in a search result list L0. Then, the search unit 26 extracts a predetermined number of top case images sorted in the search result list L0 as the similar case images from the case database DB. In addition, the similar case image corresponds to a similar medical image.

Figure 8:
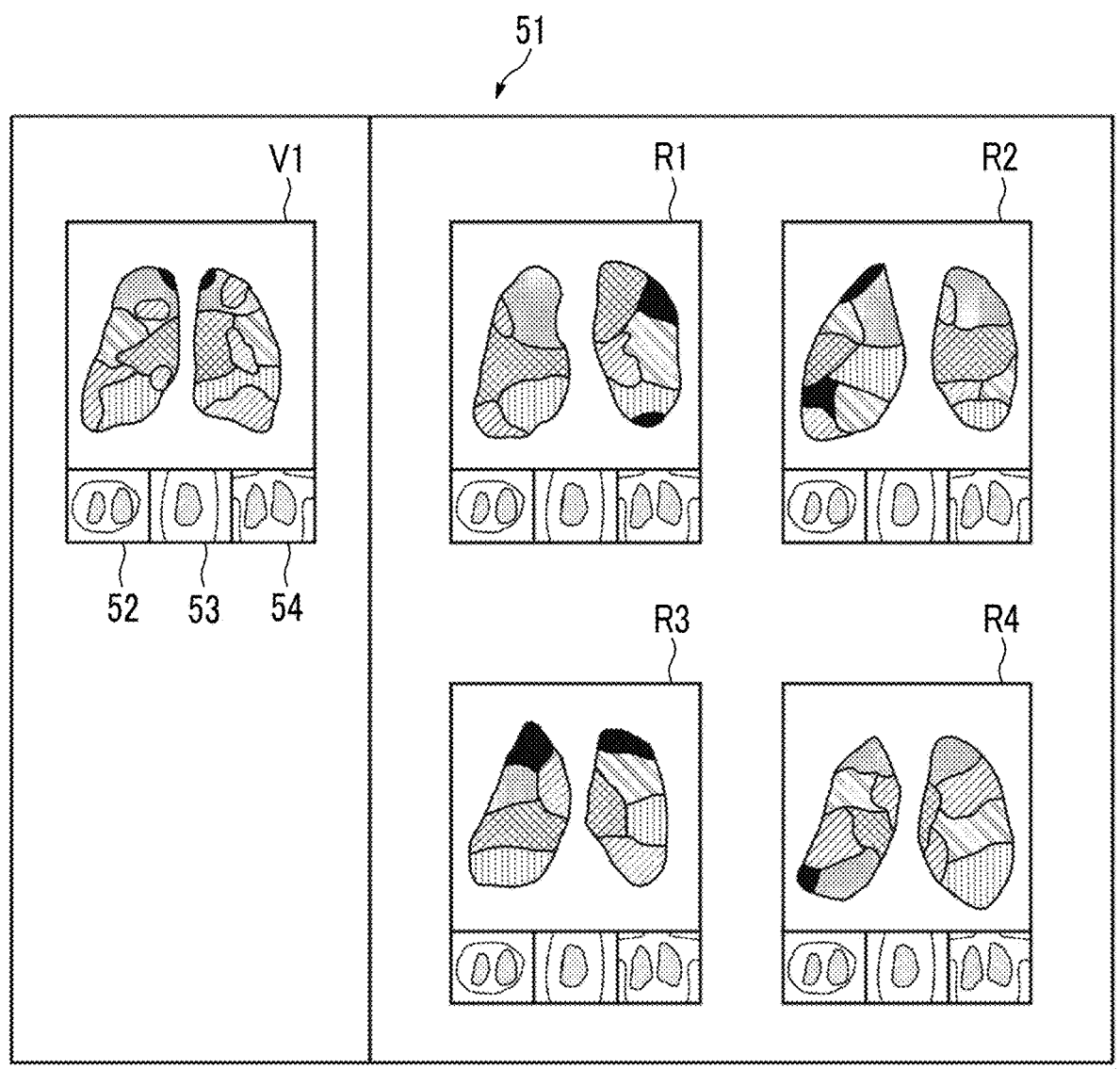
FIG. 8 is a diagram illustrating search results.

The display control unit 27 displays the search results of the search unit 26 on the display unit 14. FIG. 8 is a diagram illustrating the search results. As illustrated in FIG. 8, a labeled examination image V1 and labeled similar case images R1 to R4 are displayed in search results 51. In addition, here, four similar case images R1 to R4 are displayed. However, more similar case images may be displayed.

In FIG. 8, the examination image V1 and the similar case images R1 to R4 are projection images projected by a predetermined projection method. Further, only five types of labeling are illustrated in FIG. 8 for the sake of description. However, in practice, the types of labeling correspond to the types of classified findings. Examination slice images 52 to 54 in three cross sections of an axial cross section, a sagittal cross section, and a coronal cross section are displayed below the examination image V1. In addition, case slice images of the same three cross sections as described above are displayed below each of the similar case images R1 to R4. Further, the slice planes of the examination slice images 52 to 54 displayed below the examination image V1 and the case slice images displayed below the similar case images R1 to R4 can be switched by an operation from the input unit 15.

Figure 9:
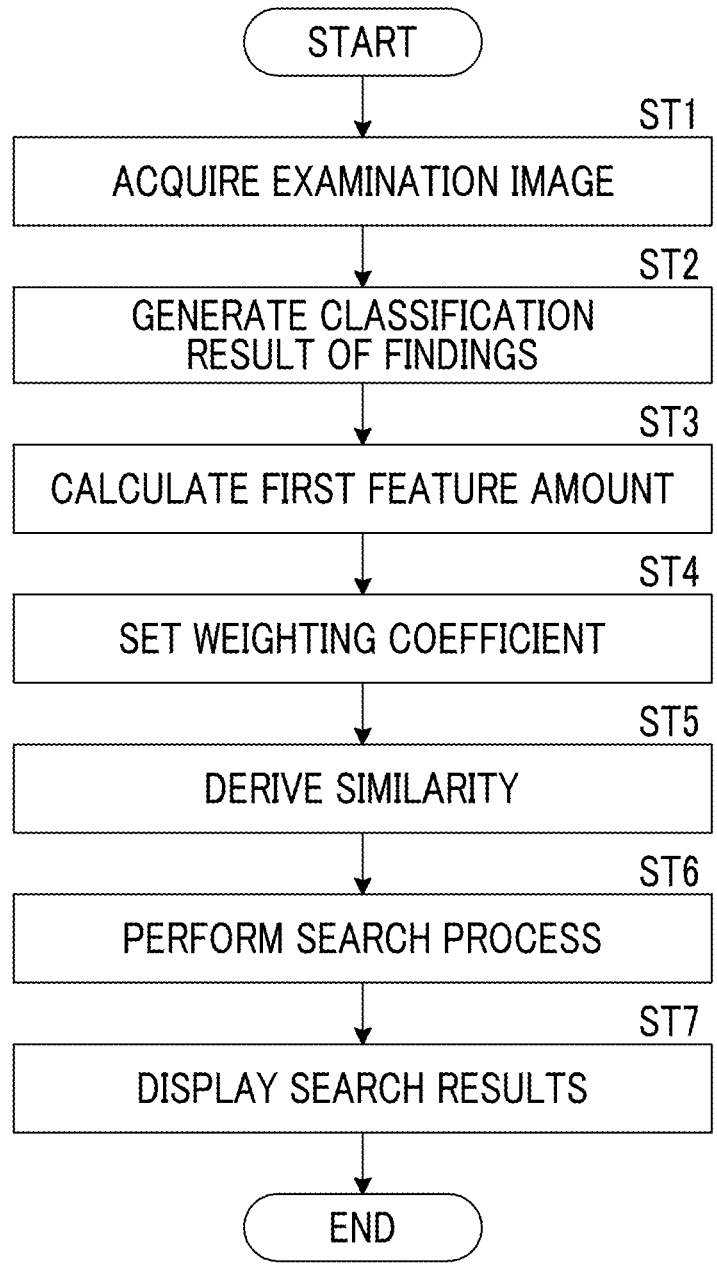
FIG. 9 is a flowchart illustrating a process performed in the first embodiment.

Then, a process performed in the first embodiment will be described. FIG. 9 is a flowchart illustrating the process performed in the first embodiment. First, the image acquisition unit 21 acquires the examination image V0 (Step ST1). The finding classification unit 22 classifies a lung region included in the examination image V0 into a plurality of types of lesion regions indicating a plurality of types of findings and generates the classification result of findings (Step ST2). Then, the feature amount calculation unit 23 calculates the first feature amount for each of the findings classified in the examination image V0 (Step ST3). In addition, the weighting coefficient setting unit 24 sets the weighting coefficient Wi for each finding of the examination image V0 (Step ST4).

Then, the similarity derivation unit 25 performs a weighting operation for the first feature amount for each finding calculated in the examination image V0 and the second feature amount for each finding calculated in advance in the case image on the basis of the weighting coefficient Wi to derive the similarity between the examination image V0 and the case image (Step ST5). In addition, as described above, the similarity derivation unit 25 derives the similarities between the examination image V0 and all of the case images registered in the case database DB. Further, the search unit 26 performs a search process on the basis of the similarities (Step ST6), and the display control unit 27 displays the search results on the display unit 14 (Step ST7). Then, the process ends.

In accordance with the above, according to this embodiment, a plurality of evaluation values indicating the possibility of each pixel of the examination image V0 being each of a plurality of types of findings are calculated, and each pixel of the examination image V0 is classified into at least one of the plurality of types of findings on the basis of the plurality of evaluation values. In addition, the first feature amount is calculated for each of the findings classified in the examination image V0. Further, the weighting coefficient indicating the degree of weighting which varies depending on the size of each finding is set for each of the findings classified in the examination image V0. Then, the weighting operation is performed for the first feature amount for each finding calculated in the examination image V0 and the second feature amount for each finding calculated in advance in the case image on the basis of the weighting coefficient to derive the similarity between the examination image V0 and the case image. According to this embodiment, in accordance with the above, the weighting coefficient indicating the degree of weighting which varies depending on the size of each finding is set. Therefore, it is possible to appropriately determine the similarity between the images according to the sizes of the findings included in the examination image V0 and the case image.

In addition, in the above-described embodiment, the finding classification unit 22 classifies each pixel of the examination image V0 into one finding having the maximum evaluation value. However, the finding classification unit 22 may classify each pixel of the examination image V0 into a plurality of findings. Specifically, each pixel of the examination image may be classified into a plurality of findings including a finding having an evaluation value that is equal to or greater than a predetermined threshold value in addition to the finding having the maximum evaluation value. Hereinafter, this will be described as a second embodiment. Here, the second embodiment is different from the first embodiment in the process performed by the finding classification unit 22. The configuration of the apparatus is the same as that in FIG. 2. Therefore, the detailed description of the apparatus will be omitted.

Here, the actual aspect of the medical image is various. Not all states can be expressed by the defined findings. For example, there may be an intermediate state in which two findings are mixed. In addition, there are lesions whose density and size change with the progress of the disease, and small differences in density and size may result in different findings. However, in this case, the similarity between the findings is high.

In a case in which the similarity can be calculated in consideration of the mixture of findings and the similarity between the findings, it is possible to search for a case image more medically similar to the examination image V0. Therefore, in the second embodiment, the finding classification unit 22 is allowed to classify each pixel of the examination image V0 into a plurality of findings.

Here, as illustrated in FIG. 4, in a case in which an evaluation value corresponding to the type of finding for a central pixel of a certain region of interest is calculated, the evaluation value of the ground-glass shadow is 7.6, which is not the maximum. It is highly likely that the pixel indicates a state in which the reticular shadow and the ground-glass shadow are mixed. Therefore, in the second embodiment, the finding classification unit 22 classifies a certain pixel into a finding having an evaluation value that is equal to or greater than a predetermined threshold value in addition to a finding having the maximum evaluation value. In addition, a value that is a times the maximum value of the evaluation value (for example, $\alpha=0.7$) can be used as the threshold value. However, the threshold value is not limited thereto, and an absolute value may be used. Further, in the second embodiment, there may be no finding having an evaluation value that is equal to or greater than the threshold value other than the finding having the maximum evaluation value. In this case, each pixel is not classified into a plurality of findings, but is classified into only one finding. Therefore, in the second embodiment, each pixel of the examination image V0 is classified into one or more findings.

Figure 10:
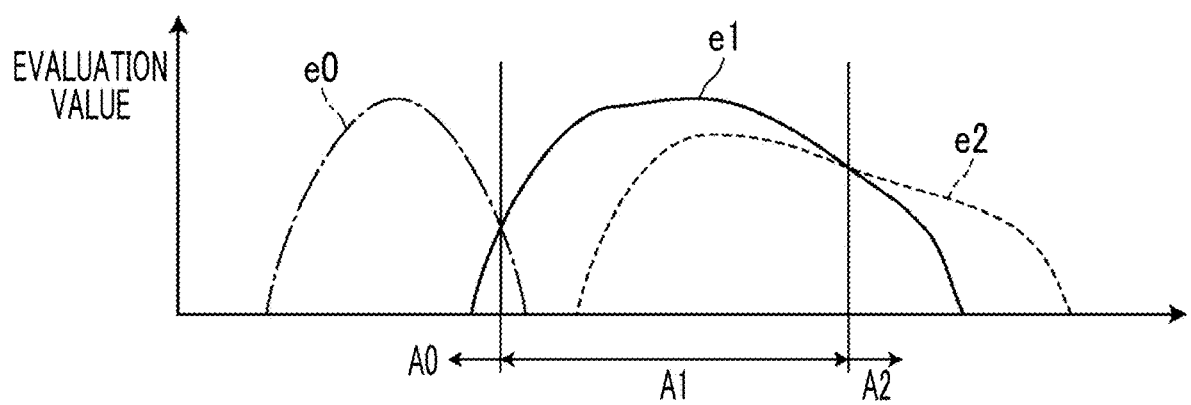
FIG. 10 is a diagram one-dimensionally illustrating a classification result of findings in an examination image V0.

FIG. 10 is a diagram one-dimensionally illustrating the classification result of findings in the examination image V. In FIG. 10, the horizontal axis indicates the position of an image and the vertical axis indicates the evaluation values of the findings. Further, in FIG. 10, it is assumed that the examination image V0 is classified into three regions A0 to A2, which are findings e0 to e2, respectively, using only the maximum value of the evaluation value of the finding in each pixel. Furthermore, in FIG. 10, the distribution of the evaluation value of the finding e0 in the region A0 is represented by a one-dot chain line, the distribution of the evaluation value of the finding e1 in the region A1 is represented by a solid line, and the distribution of the evaluation value of the finding e2 in the region A2 is represented by a dashed line.

Figure 11:
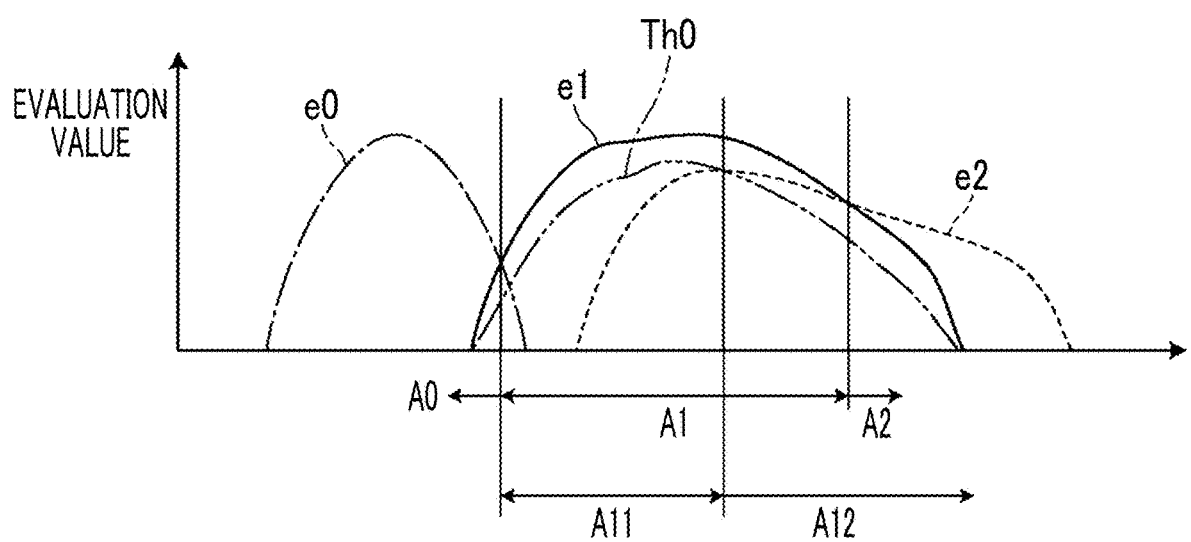
FIG. 11 is a diagram illustrating the classification result of findings in consideration of an evaluation value that is equal to or greater than a times the evaluation value of a finding e1 in a region A1 in FIG. 10.

FIG. 11 is a diagram illustrating the classification result of findings considering an evaluation value that is equal to or greater than a times the evaluation value of the finding e1 in the region A1 in FIG. 10. In addition, in FIG. 11, the distribution of a threshold value Th0 that is a times the maximum value of the evaluation value of the finding e1 in the region A1 is represented by a virtual line. In the region A1 classified into the finding e1 in FIG. 10, in a case in which classification into a plurality of findings using the threshold value Th0 which is a times the maximum value of the evaluation value of the finding e1 is allowed, the region of the finding e2 increases. As a result, the region A1 includes a region A11 of the finding e1 and a region A12 of the finding e2. As a result, in a case in which the similarity between the examination image V0 and the case image is calculated, the feature amount for the finding e2 is considered, which makes it possible to search for a case image in consideration of the similarity of the finding e2.

In accordance with the above, in a case in which each pixel of the examination image V0 is classified into a plurality of findings, the finding classification unit 22 classifies each pixel into one or more findings corresponding to the evaluation values. The feature amount calculation unit 23 calculates the first feature amount for each classified finding as in the first embodiment. Here, in the first embodiment, only the feature amount of the finding e1 is calculated in the region A1 illustrated in FIG. 10. However, in the second embodiment, in addition to the feature amount of the finding e1, the feature amount of the finding e2 in the region A12 is calculated in the region A1 illustrated in FIG. 11. Therefore, in the second embodiment, the feature amount calculation unit 23 calculates the feature amount of the finding e2 for a larger number of regions.

Figure 12:
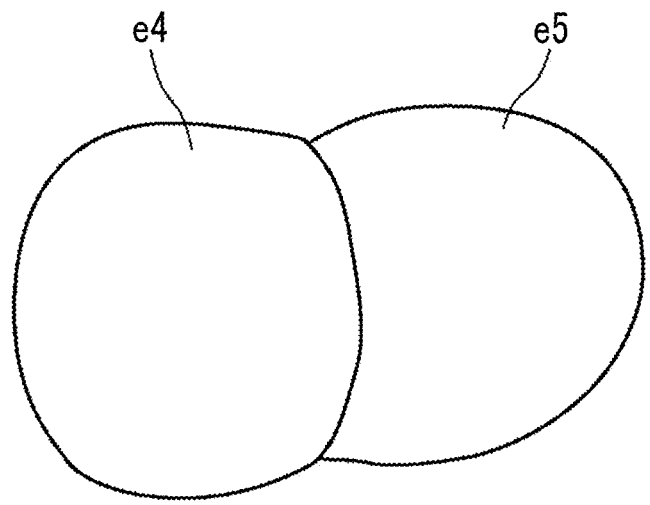
FIG. 12 is a diagram illustrating the classification result of findings in consideration of an evaluation value that is equal to or greater than a times the maximum evaluation value.
Figure 13:
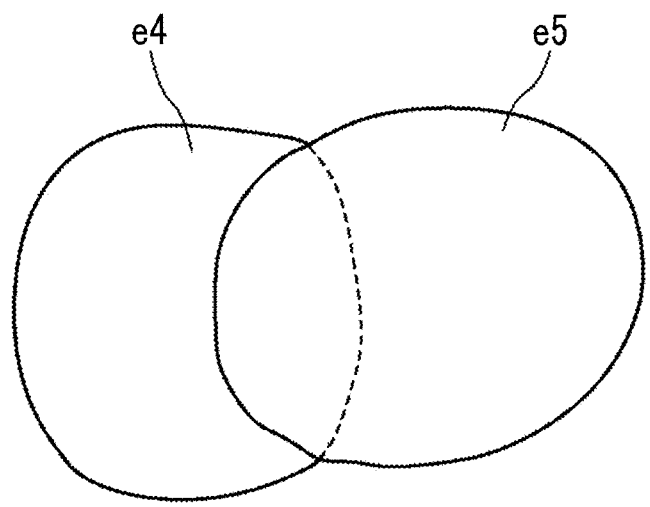
FIG. 13 is a diagram illustrating the classification result of findings in consideration of an evaluation value that is equal to or greater than a times the maximum evaluation value.

The weighting coefficient setting unit 24 calculates the weighting coefficient Wi as in the first embodiment, and sets the weighting coefficient using the volume or the finding occupancy of one or more findings into which each pixel of the examination image V0 is classified. In the second embodiment, the classification of each pixel of the examination image V0 into one or more findings is allowed. Therefore, in a case in which only the maximum value of the evaluation value is used, regions A4 and A5 classified into a finding e4 and a finding e5, respectively, as illustrated in FIG. 12 may be classified such that the region of the findings e5 is larger than that in FIG. 12 as illustrated in FIG. 13 as a result of allowing the classification into one or more findings. Therefore, in a case in which the weighting coefficient Wi is set, the weighting coefficient setting unit 24 uses the finding occupancy for the region illustrated in FIG. 12 for the finding e4 and uses the finding occupancy for the region illustrated in FIG. 13 for the finding e5.

The similarity derivation unit 25 derives the similarity between the examination image V0 and the case image, using one or more findings into which each pixel is classified, as in the first embodiment. In addition, for the difference Dsi between the sizes of the findings, as in the case in which the weighting coefficient setting unit 24 sets the weighting coefficient Wi, the finding occupancy for the region illustrated in FIG. 12 is used for the finding e4, and the finding occupancy for the region illustrated in FIG. 13 is used for the finding e5.

In accordance with the above, the allowance of the classification of each pixel of the examination image V0 into one or more findings makes it possible to derive the similarity between the examination image V0 and the case image in consideration of the situation in which a plurality of findings are mixed.

Further, in the above-described embodiment, each pixel of the examination image V0 is classified into one or more findings. However, among a plurality of types of findings, for example, two or more findings having a similar symptom may be grouped and defined as a group finding, and each pixel of the examination image V0 may be classified into findings including the group finding. For example, in a case in which the findings e4 and e5 illustrated in FIGS. 12 and 13 are grouped in the same group finding e6, the feature amount calculation unit 23 calculates a feature amount for the group finding e6 in addition to the findings e4 and e5. The weighting coefficient setting unit 24 sets a weighting coefficient for the group finding e6 in addition to the findings e4 and e5, and the similarity derivation unit 25 derives the similarity between the examination image V0 and the case image using the group finding e6 in addition to the findings e4 and e5. Therefore, it is possible to determine the similarity between the examination image V0 and the case image in consideration of the findings having a similar symptom.

Further, in each of the above-described embodiments, a plurality of evaluation values indicating the possibility of each pixel of the examination image V0 being each of a plurality of types of findings are calculated for each pixel, and each pixel of the examination image V0 is classified into at least one of the plurality of types of findings on the basis of the plurality of evaluation values. However, a finding classification method is not limited to the method using the evaluation values.

In addition, in each of the above-described embodiments, the case database DB is stored in the image storage server 3. However, the case database DB may be stored in the storage 13.

Further, in each of the above-described embodiments, the examination image is registered in the case database DB. However, images other than the examination image may be registered as registration target images in the case database.

In each of the above-described embodiments, for example, the following various processors can be used as the hardware structure of processing units performing various processes, such as the image acquisition unit 21, the finding classification unit 22, the feature amount calculation unit 23, the weighting coefficient setting unit 24, the similarity derivation unit 25, the search unit 26, and the display control unit 27. The various processors include a CPU which is a general-purpose processor executing software (program) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs and a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system on chip (SoC). In accordance with the above, various processing units are configured by using one or more of the various processors as a hardware structure.

In addition, specifically, an electric circuit (circuitry) obtained by combining circuit elements, such as semiconductor elements, can be used as the hardware structure of the various processors.

EXPLANATION OF REFERENCES

1: similarity determination apparatus
2: three-dimensional imaging apparatus
3: image storage server
4: network
11: CPU
12: memory
13: storage
14: display unit
15: input unit
21: image acquisition unit
22: finding classification unit
23: feature amount calculation unit
24: weighting coefficient setting unit
25: similarity derivation unit
26: search unit
27: display control unit
40: multi-layer neural network
41: input layer
42: output layer
51: search results
52 to 54: examination slice image
A0 to A2, A4, A5, A11, A12: region
DB: case database
e0 to e5: finding
L0: search result list
R1 to R4: similar case image
V0, V1: examination image

What is claimed is:

1. A similarity determination apparatus for determining a similarity between a first medical image and a second medical image, comprising:
  a processor configured to classify each pixel of the first medical image into at least one of a plurality of types of findings;
  derive a first feature amount for each finding classified in the first medical image;
  set a weighting coefficient indicating a degree of weighting, which varies depending on a size of each finding, for each finding classified in the first medical image;
  derive the similarity between the first medical image and the second medical image by performing a weighting operation for the first feature amount for each finding derived in the first medical image and a second feature amount for each finding derived in advance in the second medical image on the basis of the weighting coefficient; and
  derive a higher similarity in a case that a first finding of findings having a relatively large size derived from a first image as the first medical image becomes larger than the first finding of findings having a relatively small size derived from a second image as the first medical image.

2. The similarity determination apparatus according to claim 1,
wherein the processor is configured to set the weighting coefficient indicating the degree of weighting which varies depending on each type of finding.

3. The similarity determination apparatus according to claim 1,
wherein the processor is configured to calculate a plurality of evaluation values indicating a possibility of each pixel of the first medical image being each of the plurality of types of findings and classify each pixel of the first medical image into at least one of the plurality of types of findings on the basis of the plurality of evaluation values.

4. The similarity determination apparatus according to claim 2,
wherein the processor is configured to calculate a plurality of evaluation values indicating a possibility of each pixel of the first medical image being each of the plurality of types of findings and classifies each pixel of the first medical image into at least one of the plurality of types of findings on the basis of the plurality of evaluation values.

5. The similarity determination apparatus according to claim 3,
wherein the processor is configured to classify each pixel of the first medical image into a plurality of findings including a finding having a maximum evaluation value and a finding having an evaluation value that is equal to or greater than a predetermined threshold value.

6. The similarity determination apparatus according to claim 5,
wherein the processor is configured to use the threshold value determined on the basis of the evaluation value of the finding having the maximum evaluation value.

7. The similarity determination apparatus according to claim 1,
wherein the processor is configured to classify each pixel into a group finding including two or more findings among the plurality of types of findings.

8. The similarity determination apparatus according to claim 2,
wherein the processor is configured to classify each pixel into a group finding including two or more findings among the plurality of types of findings.

9. The similarity determination apparatus according to claim 1,
wherein the processor comprises a discriminator that has been subjected to machine learning so as to classify the plurality of types of findings, and is configured to classify each pixel of the first medical image into the plurality of types of findings using the discriminator.

10. The similarity determination apparatus according to claim 2,
wherein the processor comprises a discriminator that has been subjected to machine learning so as to classify the plurality of types of findings, and classifies each pixel of the first medical image into the plurality of types of findings using the discriminator.

11. The similarity determination apparatus according to claim 1, the processor further configured to:
search for the second medical image similar to the first medical image as a similar medical image on the basis of similarities between the first medical image and a plurality of the second medical images with reference to a case database in which the plurality of second medical images are registered and the second feature amount for each of the plurality of second medical images are registered so as to be associated with each of the plurality of second medical images.

12. The similarity determination apparatus according to claim 2, the processor further configured to:
search for the second medical image similar to the first medical image as a similar medical image on the basis of similarities between the first medical image and a plurality of the second medical images with reference to a case database in which the plurality of second medical images are registered and the second feature amounts for each of the plurality of second medical images are registered so as to be associated with each of the plurality of second medical images.

13. The similarity determination apparatus according to claim 11, the processor further configured to:
display a search result of the similar medical image on a display.

14. A similarity determination method for determining a similarity between a first medical image and a second medical image, the method comprising:
classifying each pixel of the first medical image into at least one of a plurality of types of findings;
deriving a first feature amount for each finding classified in the first medical image;
setting a weighting coefficient indicating a degree of weighting, which varies depending on a size of each finding, for each finding classified in the first medical image;
deriving the similarity between the first medical image and the second medical image by performing a weighting operation for the first feature amount for each finding derived in the first medical image and a second feature amount for each finding derived in advance in the second medical image on the basis of the weighting coefficient; and
deriving a higher similarity in a case that a first finding of findings having a relatively large size derived from a first image as the first medical image becomes larger than the first finding of findings having a relatively small size derived from a second image as the first medical image.

15. A non-transitory computer recording medium storing a similarity determination program that causes a computer to perform a process of determining a similarity between a first medical image and a second medical image, the program causing the computer to perform:
a step of classifying each pixel of the first medical image into at least one of a plurality of types of findings;
a step of deriving a first feature amount for each finding classified in the first medical image;
a step of setting a weighting coefficient indicating a degree of weighting, which varies depending on a size of each finding, for each finding classified in the first medical image;
a step of deriving the similarity between the first medical image and the second medical image by performing a weighting operation for the first feature amount for each finding derived in the first medical image and a second feature amount for each finding derived in advance in the second medical image on the basis of the weighting coefficient; and a step of deriving a higher similarity in a case that a first finding of findings having a relatively large size derived from a first image as the first medical image becomes larger than the first finding of findings having a relatively small size derived from a second image as the first medical image.

16. The similarity determination apparatus according to claim 11, the processor further configured to:

derive a different similarity in a case that a first finding and a second finding of findings derived from the first medical image have the same size when a difference between the first feature amount of the first finding and the second feature amount of the first finding is the same as a difference between the first feature amount of the second finding and the second feature amount of the second finding.

\* \* \* \* \*